(12) United States Patent
Loistl

(10) Patent No.: US 12,344,342 B2
(45) Date of Patent: Jul. 1, 2025

(54) MOTORCYCLE

(71) Applicant: Bayerische Motoren Werke Aktiengesellschaft, Munich (DE)

(72) Inventor: Stephan Loistl, Woerthsee (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 106 days.

(21) Appl. No.: 18/026,174

(22) PCT Filed: Oct. 27, 2021

(86) PCT No.: PCT/EP2021/079765
§ 371 (c)(1),
(2) Date: Mar. 14, 2023

(87) PCT Pub. No.: WO2022/106163
PCT Pub. Date: May 27, 2022

(65) Prior Publication Data
US 2023/0356795 A1  Nov. 9, 2023

(30) Foreign Application Priority Data
Nov. 20, 2020 (DE) .............. 10 2020 130 755.1

(51) Int. Cl.
*B62H 5/08* (2006.01)
*B62H 5/06* (2006.01)

(52) U.S. Cl.
CPC .......... *B62H 5/08* (2013.01); *B62H 5/06* (2013.01)

(58) Field of Classification Search
CPC ... B62H 5/00; B62H 5/02; B62H 5/04; B62H 5/06; B62H 5/08
USPC ............................................. 70/233
See application file for complete search history.

(56) References Cited

U.S. PATENT DOCUMENTS

| | | | |
|---|---|---|---|
| 7,195,265 B2 * | 3/2007 | Lederer | B62K 21/04 |
| | | | 280/279 |
| 9,540,062 B2 * | 1/2017 | Kinoshita | B62H 5/00 |
| 2004/0145449 A1 | 7/2004 | Yamamoto et al. | |
| 2010/0236304 A1 * | 9/2010 | Yuhi | B62H 5/02 |
| | | | 70/224 |

FOREIGN PATENT DOCUMENTS

| | | |
|---|---|---|
| CN | 1521065 A | 8/2004 |
| CN | 103950489 A | 7/2014 |
| CN | 204801933 U | 11/2015 |
| CN | 111351389 A | 6/2020 |
| DE | 10 2018 128 430 A1 | 5/2020 |
| EP | 0 041 058 A1 | 12/1981 |
| GB | 13407 A | 4/1914 |

(Continued)

OTHER PUBLICATIONS

International Search Report (PCT/ISA/210) issued in PCT Application No. PCT/EP2021/079765 dated Feb. 24, 2022 with English translation (five (5) pages).

(Continued)

*Primary Examiner* — Nathan Cumar
(74) *Attorney, Agent, or Firm* — Crowell & Moring LLP

(57) ABSTRACT

A motorcycle including an ignition lock which is fastened directly in or on a decoupling element. The decoupling element is integrated into a chassis component or structural component of the motorcycle.

10 Claims, 1 Drawing Sheet

(56) References Cited

FOREIGN PATENT DOCUMENTS

| | | | |
|---|---|---|---|
| GB | 650154 A | | 2/1951 |
| JP | 2004-276865 A | | 10/2004 |
| JP | 2006231983 A | * | 9/2006 |
| JP | 2015-13536 A | | 1/2015 |

OTHER PUBLICATIONS

German-language Written Opinion (PCT/ISA/237) issued in PCT Application No. PCT/EP2021/079765 dated Feb. 24, 2022 (six (6) pages).

German-language Search Report issued in German Application No. 10 2020 130 755.1 dated Dec. 1, 2020 with partial English translation (11 pages).

English translation of Chinese-language Office Action issued in Chinese Application No. 202180063158.1 dated Nov. 30, 2024 (9 pages).

* cited by examiner

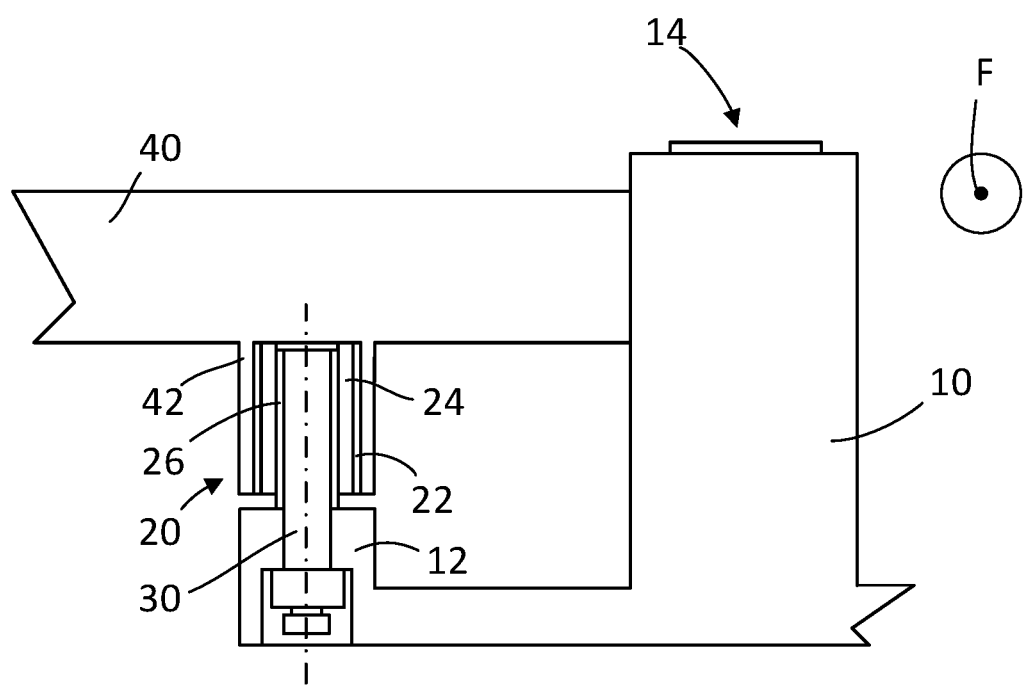

MOTORCYCLE

CROSS REFERENCE TO RELATED APPLICATION

This application claims priority under 35 U.S.C. § 119 from German Patent Application No. 102020130755.1, filed Nov. 20, 2020, the entire disclosure of which is herein expressly incorporated by reference.

BACKGROUND AND SUMMARY OF THE INVENTION

The present invention relates to a motorcycle, in particular a larger-engined motorcycle.

Specifically, the present document is concerned with the fastening of an ignition lock or an ignition steering lock to a larger-engined motorcycle, for example. Such devices are often installed directly in or on the corresponding larger-engined motorcycle in a structurally fixed manner. A typical fastening point is, for example, the fork bridge of a fork of the larger-engined motorcycle in question. A disadvantage here is that, owing to the structurally fixed screw connection, jolts and vibrations which occur during riding are introduced directly into the ignition lock or into the ignition steering lock. This can lead to defects. Electronic ignition locks or ignition steering locks in particular can here be damaged. DE 10 2018 128 430 A1 therefore proposes a device for fixing an ignition steering lock of a larger-engined motorcycle having a mount to which the ignition steering lock is fixed, wherein by means of the mount the device can be fixed to the larger-engined motorcycle by fastening means and comprises resilient decoupling elements arranged on the mount for jolt and vibration decoupling between the larger-engined motorcycle and the mount. Although good decoupling can thereby be achieved, the outlay in terms of construction and mounting is high. Owing to the large number of components used, this solution is additionally cost-intensive and requires a large amount of installation space.

Accordingly, an object of the present invention is to provide a motorcycle, wherein the integration or attachment of the ignition lock or of the ignition steering lock is to be simplified compared to the known solutions, without subjecting the ignition lock or the ignition steering lock to additional mechanical load.

This object is achieved by a motorcycle according to claim 1. Further advantages and features will become apparent from the dependent claims and from the description and the accompanying FIGURE.

According to the invention, a motorcycle comprises an ignition lock or an ignition steering lock, wherein the ignition lock is fastened directly in or to a decoupling element, and wherein the decoupling element is integrated into a chassis component or structural component of the motorcycle, in particular is integrated directly. The ignition lock or ignition steering lock is a component which is provided and configured to secure the motorcycle against unauthorized use. The ignition lock/ignition steering lock is, for example, provided or designed to start the motorcycle or the engine thereof. The engine can be a combustion engine or an electrical machine, alternatively also a hybrid concept comprising both a combustion-engine drive and an electric drive. In addition, the ignition lock or the ignition steering lock can also provide the function of an immobilizer by, for example, when it is arranged in the region of the fork of the motorcycle, preventing the handlebar from being able to be moved (handlebar lock or handlebar immobilizer). Advantageously, the ignition lock is attached to the motorcycle not directly in a structurally fixed manner but indirectly by way of the coupling element, wherein the coupling element, however, is advantageously connected directly, in particular in a structurally fixed manner, to the chassis component or structural component. At least in some regions or portions, the decoupling element, preferably owing to a corresponding choice of material, is of resilient form or designed such that it provides a spring and/or damper functionality which is suitable for shielding the ignition lock/ignition steering lock from jolts, vibrations, etc. of the chassis component or structural component, or at least for reducing the transmission thereof to the ignition lock/ignition steering lock. A complex mounting device can thus be dispensed with. The ignition lock/ignition steering lock is nevertheless arranged, mounted or fastened in a decoupled manner.

According to a preferred embodiment, the decoupling element is integrated into the fork bridge of a fork of the motorcycle. The expression "integrated" is to be understood as meaning that there are no further components between the actual decoupling element and the chassis component or structural component, in this case the fork bridge. Likewise, the ignition lock or the ignition steering lock is attached or fastened directly to the decoupling element. No further devices or mounting elements are thus arranged therebetween.

According to one embodiment, the decoupling element is in the form of a bushing which has a preferably multi-part, for example three-part or three-layer, construction, wherein at least one part is formed of a resilient material, such as, for example, a rubber material. The resilient material is in particular designed to provide the decoupling function. The decoupling element is in particular designed to mount the ignition lock or the ignition steering lock in a sprung or cushioned manner, so that any jolts, vibrations, etc. on the part of the motorcycle are not transmitted directly into the ignition lock or the ignition steering lock. In this context, a multi-part construction can in particular be advantageous for connecting the decoupling element to the chassis component or structural component or to the ignition lock or to the ignition steering lock.

According to one embodiment, the bushing is round, in particular circular. Alternatively, however, other cross-sectional forms may also be advantageous.

According to one embodiment, the bushing has an outer bushing of an aluminum material and an inner bushing of a steel material, wherein an intermediate bushing of a rubber material is formed therebetween. The rubber material is, for example, vulcanized onto the outer bushing and/or the inner bushing. The material of the outer bushing is advantageously matched to the material of the chassis component or structural component in which the bushing is arranged. In the case of a fork bridge of an aluminum material, the outer bushing is therefore advantageously likewise made of an aluminum material. The inner bushing is advantageously designed to fasten the ignition lock. To that end, corresponding fastening means are provided on the inner bushing. According to one embodiment, the inner bushing has a thread, for example.

The ignition lock is advantageously fastened to the decoupling element directly by way of a fastening means, in particular is screwed thereto. A shear bolt is advantageously used as the fastening means.

In particular, the fastening means is arranged such that it is decoupled from the chassis component or structural component by way of the decoupling element. The fastening means is thus not screwed in a structurally fixed manner but merely cooperates with the decoupling element. It is thus ensured that the ignition lock or ignition steering lock is also actually decoupled.

The decoupling element is preferably fastened such that it is non-detachably connected to the chassis component or structural component. The actual configuration is dependent on the installation situation or the materials used.

According to one embodiment, the decoupling element is, for example, pressed or press-fitted, or pressed or press-fitted for fastening, to the chassis component or structural component, wherein the chassis component or structural component is in particular a fork bridge. According to one embodiment, the inner bushing or the outer bushing, for example, is shaped at the end, in order thus to effect additional fastening of the decoupling element.

According to one embodiment, at least one part of the decoupling element is integrally formed by the chassis component or structural component. According to one embodiment, the outer bushing, for example, is integrally formed by the fork bridge. The resilient material is in this case arranged directly in the fork bridge without a (an outer) bushing mounted therebetween.

According to one embodiment, the resilient material is cast, in particular cast into the chassis component or structural component. According to one embodiment, the decoupling component is produced directly on the chassis component or structural component, in particular by means of a casting method, for example. According to one embodiment, the decoupling element is also formed wholly of the resilient material, thus is not in multi-part form, wherein it must be ensured that the attachment or fastening of the ignition lock or ignition steering lock by way of a fastening means, such as, for example, a bolt, is possible with sufficient strength.

According to one embodiment, the ignition lock is integrally cast or attached into or to the chassis component or structural component indirectly by way of the resilient material. The ignition lock is thus arranged on or fastened to the decoupling element not subsequently but directly on production of the decoupling element, for example during casting of the resilient material. In a first step, the ignition lock/ignition steering lock is positioned relative to the chassis component or structural component, wherein a portion of the ignition lock/ignition steering lock or a fastening means/element connected thereto projects, for example, into an opening of the chassis component or structural component. In a second step, the opening is filled with a suitable material, for example with a suitable resilient plastics material, in order to produce the decoupling element. After curing thereof, the ignition lock is fixed and mounted in a sprung/cushioned manner. Subsequent or separate fastening can be dispensed with entirely.

According to a preferred embodiment, the ignition lock has at least one fastening portion which is fastened directly in or to a or the decoupling element. Preferably, the ignition lock has, for example, two fastening portions which each cooperate with a decoupling element or which are each connected by way of a decoupling element to the chassis component or structural component. The fastening portions are regions or portions of the ignition lock/ignition steering lock, or of the housing thereof, which are designed for the arrangement of a fastening means, such as a bolt. The housing of the ignition lock/ignition steering lock is preferably made of plastics material and/or metal. In addition to the fastening portions, the ignition lock advantageously has an operating element, wherein the operating element comprises, for example, a start-stop switch or a lock cylinder.

According to a preferred embodiment, the ignition steering lock is in the present case an electric ignition steering lock, in particular comprising a remote control. The rider simply has to carry the ignition key with him. The engine is started and switched off preferably solely by way of the operating element, for example the start-stop switch. In addition, the ignition lock or ignition steering lock typically also has a device which can preferably serve as a handlebar lock.

As already mentioned, the chassis component or structural component is preferably the fork bridge, in particular the upper fork bridge, of a fork of the motorcycle. Alternatively, the chassis component or structural component can, however, also be a frame of the motorcycle. The motorcycle is preferably a larger-engined motorcycle or a motor scooter.

Further advantages and features will become apparent from the following description of an embodiment of a motorcycle shown in part and schematically, with reference to the accompanying FIGURE.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1: is a schematic and partial representation of an embodiment of a motorcycle, wherein in particular a fork bridge of the motorcycle and part of an ignition lock in accordance with the present invention are to be seen.

DETAILED DESCRIPTION

FIG. 1 shows a motorcycle in a perspective, schematic representation seen contrary to a direction of travel F, wherein in the present case only portions are shown. Reference sign 40 denotes a fork bridge, shown in part, wherein the fork bridge has a prolongation or dome-shaped element 42 in which a decoupling element 20 is arranged. In the present case, the decoupling element 20 is in the form of a bushing, comprising an outer bushing 22, an intermediate bushing 24 and an inner bushing 26. Reference sign 10 denotes an ignition lock, only approximately half of which is shown in the present case. A left-hand fastening portion 12 can be seen, which is connected or screwed to the inner bushing 26 of the decoupling element 20 by way of a fastening means 30. The regions of the ignition lock/ignition steering lock 10 shown here are made of plastics material and/or metal, for example. The right-hand part (not shown here) of the ignition lock 10 would be formed analogously. Advantageously, the ignition lock in the present case is not connected directly in a structurally fixed manner to the chassis component or structural component, in the present case the fork bridge 40, but is decoupled therefrom by way of the decoupling element 20. A shear bolt is outlined here as the fastening means 30. The ignition lock 10 has an operating element 14, such as, for example, a start-stop switch, which must be operated in order to start the vehicle, for example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

List of Reference Signs

10 Ignition lock
12 Fastening portion
14 Operating element, start/stop switch
20 Decoupling element, bushing
22 Outer bushing
24 Intermediate bushing
26 Inner bushing
30 Fastening means
40 Chassis component or structural component, fork bridge
42 Prolongation, dome-shaped element
F Direction of travel

The invention claimed is:

1. A motorcycle, comprising:
an ignition lock,
wherein
the ignition lock is fastened directly in or to a separate decoupling element,
the separate decoupling element is coupled into a chassis component or structural component of the motorcycle,
the separate decoupling element is a bushing having a multi-part construction,
at least one part of the bushing is formed of a resilient material,
the bushing has an outer bushing and an inner bushing, and
the at least one part of the bushing formed of a resilient material is an intermediate bushing formed between the outer bushing and the inner bushing.

2. The motorcycle according to claim 1,
wherein the separate decoupling element is coupled into a fork bridge of a fork of the motorcycle.

3. The motorcycle according to claim 1,
wherein
the outer bushing is made of aluminum and the inner bushing is made of steel, and
the intermediate bushing is formed of rubber.

4. The motorcycle according to claim 1,
wherein the inner bushing has a thread.

5. The motorcycle according to claim 1,
wherein the ignition lock is fastened to the separate decoupling element directly by a fastener.

6. The motorcycle according to claim 1,
wherein the separate decoupling element is non-detachably connected to the chassis component or structural component.

7. The motorcycle according to claim 1,
wherein the separate decoupling element is press-fitted to the chassis component or structural component.

8. The motorcycle according to claim 1,
wherein at least one part of the separate decoupling element is integrally formed with the chassis component or structural component.

9. The motorcycle according to claim 1,
wherein the resilient material is cast into the chassis component or structural component.

10. The motorcycle according to claim 1,
wherein
the separate decoupling element includes one or more decoupling elements, and
the ignition lock has at least one fastening portion fastened directly in or to at least one of the one or more decoupling elements.

* * * * *